J. D. TABER.
ICE-CREAM RECEIVER.

No. 186,899. Patented Jan. 30, 1877.

Witnesses:
Jabez Talbot Jr
Martha L. Burnham

Inventor,
James D Taber

UNITED STATES PATENT OFFICE.

JAMES D. TABER, OF STOUGHTON, MASSACHUSETTS.

IMPROVEMENT IN ICE-CREAM RECEIVERS.

Specification forming part of Letters Patent No. 186,899, dated January 30, 1877; application filed April 10, 1876.

*To all whom it may concern:*

Be it known that I, JAMES D. TABER, of the town of Stoughton, in the county of Norfolk and State of Massachusetts, have invented certain new and useful Improvements in Ice-Cream Receivers; and I do hereby declare the following to be a full, clear, and exact description thereof, which will enable others skilled in the art to which it pertains to make and use the same, reference being had to the accompanying drawings, and to the letters of reference marked thereon, which form part of this specification, in which—

Figure 2:
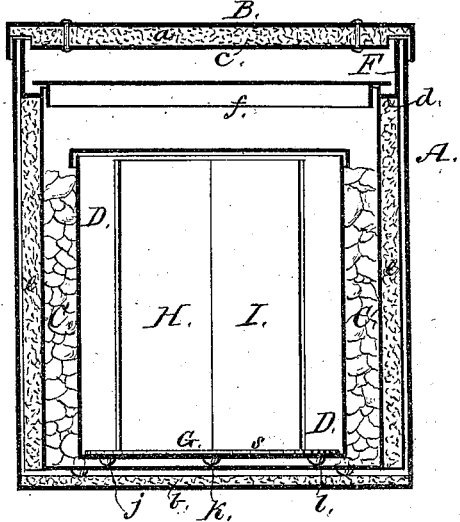
Figure 1:
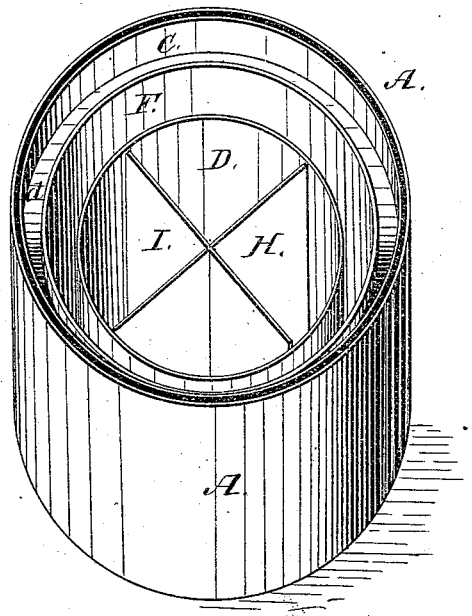
Figure 4:
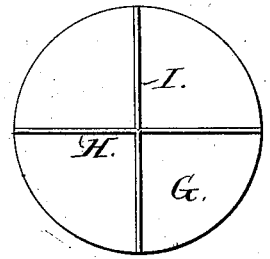
Figure 3:
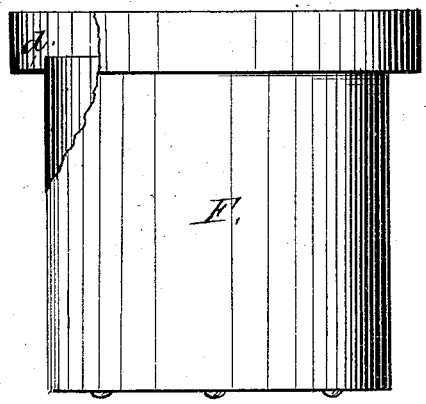
Figure 5:
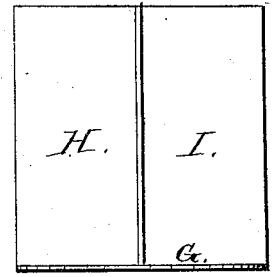

Figure 1 represents a perspective view of the receiver with the covers removed. Figs. 2, 3, 4, and 5 are detail views.

My invention relates to a new and improved mode of constructing receptacles for the preservation and transportation of ice-cream, whereby it may be kept in a frozen state and still be in a portable and convenient can or tub.

My invention consists of a portable vessel for the preservation of ice-cream during its transportation to customers, or around cities for sale in small quantities, said vessel consisting of a partitioned receptacle for holding the ice-cream, so constructed and arranged with relation to an inclosing-vessel, consisting of an outer and inner casing, having a space interposed between and all around for the reception of a felt or other good non-conductor of heat, as to leave a space between them for the use of ice, or ice and salt, as a refrigerant for the cream, the whole being provided with suitable independent and removable covers for removing the cream, and for readily replenishing the ice-chamber with ice.

It also consists in combining, with the outer and inner casings and their interposed packing, a vessel for holding the material which is to be kept cold or in a frozen condition, in such manner as to form a surrounding chamber for the reception of ice or other cooling material between said vessel and casings.

It further consists in making the cream-can G divisible by partitions H and I, by which the various kinds of ice-cream may be carried or kept apart.

To enable others skilled in the art to make and use my invention, I will now proceed to describe its parts in detail.

The outer case A may be made of wood, tin, or metal, into the bottom and cover of which are fitted circular pieces of felt, or other non-conductive material. In the bottom it is held in place by the inner case resting upon it, and in the cover it is secured by the circular piece of tin $c$, riveted or otherwise fastened to the cover B.

I make the inner case C of tin or other metal, with a lip or projection, $d$, at the top, which corresponds with the thickness of the packing $e$. Around this case C I fit a felt or other non-conductive packing, $e$, and sew or otherwise secure it thereon. To this case C I fit a common cover, as $f$.

The cream-can D is a common tin case, into which may be fitted the movable partitions G, H, and I, by which the various kinds of cream may be packed in one case, and more conveniently served by raising the partitions as the cream is taken out, for which purpose the lower ends of the movable partitions G, H, and I are connected together by a bottom plate, $s$, of a form or shape corresponding to that of vessel D, and of a diameter equal, or nearly equal to the internal diameter of said vessel. On the bottom of the cream-can D I put pedestals, as $j\ k\ l$, which allow the ice to come in contact with the lower surface of the can D.

To use this ice-cream receiver I put broken ice and salt into the case C to a sufficient depth, and then, having packed the cream-can D with the frozen cream, place it in the case C, and surround it with broken ice and salt to the top of the chamber C', formed by the space which intervenes between the centrally-arranged vessel D and inner casing C, then put on the cover B, which completes the operation, and the package is ready for transportation or storage.

Having described my invention, what I claim as new, and desire to secure by Letters Patent, is—

1. The combination of an ice-cream can or holder, G, provided with movable partitions and bottom, with a refrigerating-box, substantially as set forth.

2. The combination of the movable partitions and bottom G, H, and I, as arranged and constructed with the cream-can D, substantially as set forth.

In testimony that I claim the foregoing as of my own invention I affix my signature in the presence of two witnesses.

JAMES D. TABER.

Witnesses:
JABEZ TALBOT, Jr.,
MARTHA L. BURNHAM.